United States Patent [19]

Czarnik et al.

[11] Patent Number: 5,812,529
[45] Date of Patent: Sep. 22, 1998

[54] METHOD AND APPARATUS FOR NETWORK ASSESSMENT

[75] Inventors: Paul G. Czarnik, Danville; Carl J. Schroeder, Redwood City, both of Calif.

[73] Assignee: LanQuest Group, Fremont, Calif.

[21] Appl. No.: 747,376

[22] Filed: Nov. 12, 1996

[51] Int. Cl.[6] .................................................. H04Q 9/00
[52] U.S. Cl. ........................ 370/245; 370/252; 395/200.33
[58] Field of Search ................................ 370/230, 233, 370/235, 241, 245, 248, 252, 253, 249; 395/200.05, 200.06, 200.11, 200.13, 568, 200.33; 364/550

[56] References Cited

U.S. PATENT DOCUMENTS

| | | | |
|---|---|---|---|
| 5,218,697 | 6/1993 | Chung | 395/650 |
| 5,673,393 | 9/1997 | Marchall et al. | 395/200.04 |
| 5,680,461 | 10/1997 | McManis | 380/25 |
| 5,715,394 | 2/1998 | Jabs | 395/200.11 |

*Primary Examiner*—Chau Nguyen
*Attorney, Agent, or Firm*—Beyer & Weaver, LLP

[57] ABSTRACT

A system and method are disclosed for acquiring network performance data. A mission server is connected to a network, and is operative to interface with Clients to define and receive requests for a mission. The mission as defined includes operations that require participation in the network by devices connected to a plurality of segments at a plurality of locations within the network. A plurality of sentries are provided on devices connected to the segments of the network at locations within the network so that the devices are operative to participate in the network from the segments of the network at their locations. The sentries are then operative to support the mission by participating in the network through the devices. A request for a mission is received at the mission server and the mission is communicated from the mission server to the sentries required to execute the mission. The operations of the mission are executed by the sentries and the results of the operations are communicated from the sentries to the mission server. The result of the mission is determined from the results of the operations.

18 Claims, 8 Drawing Sheets

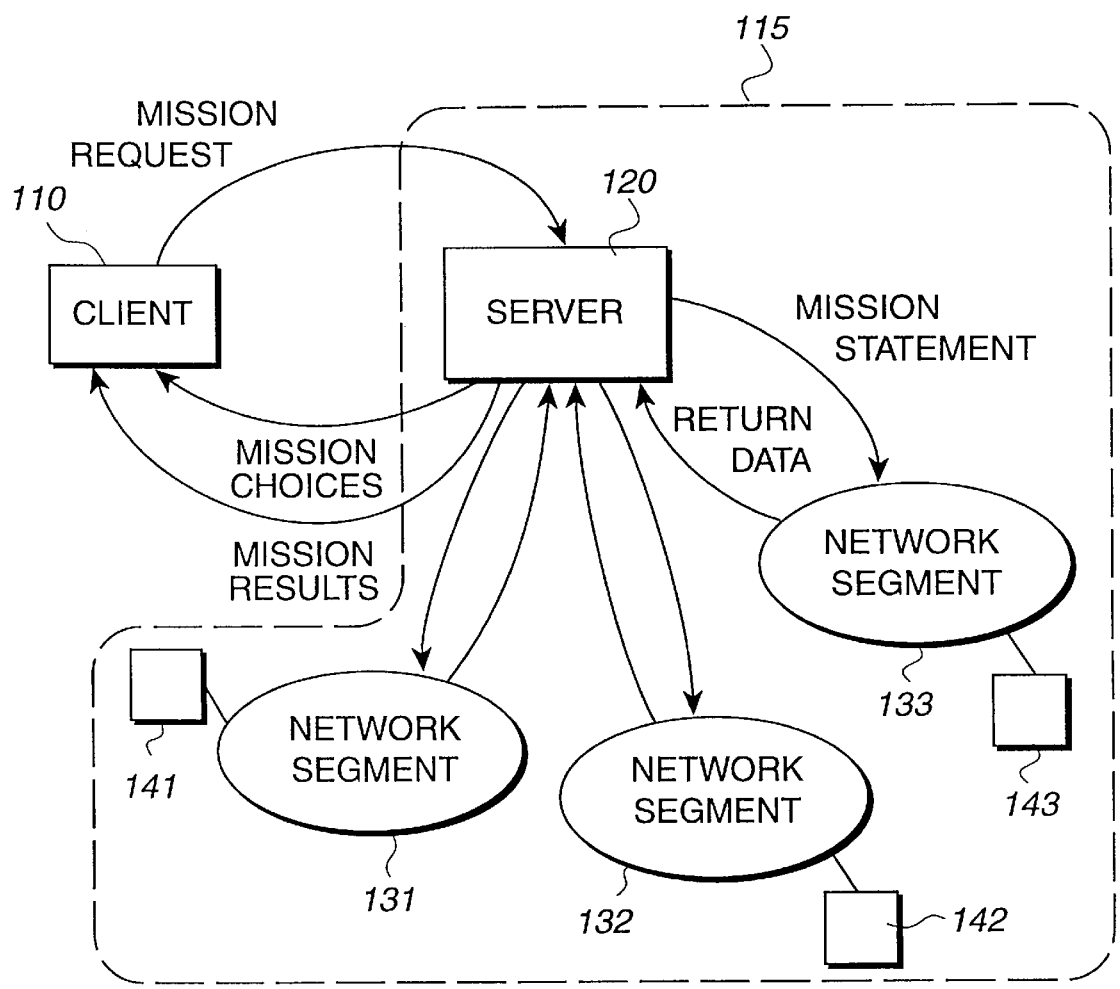
Fig. 1-A

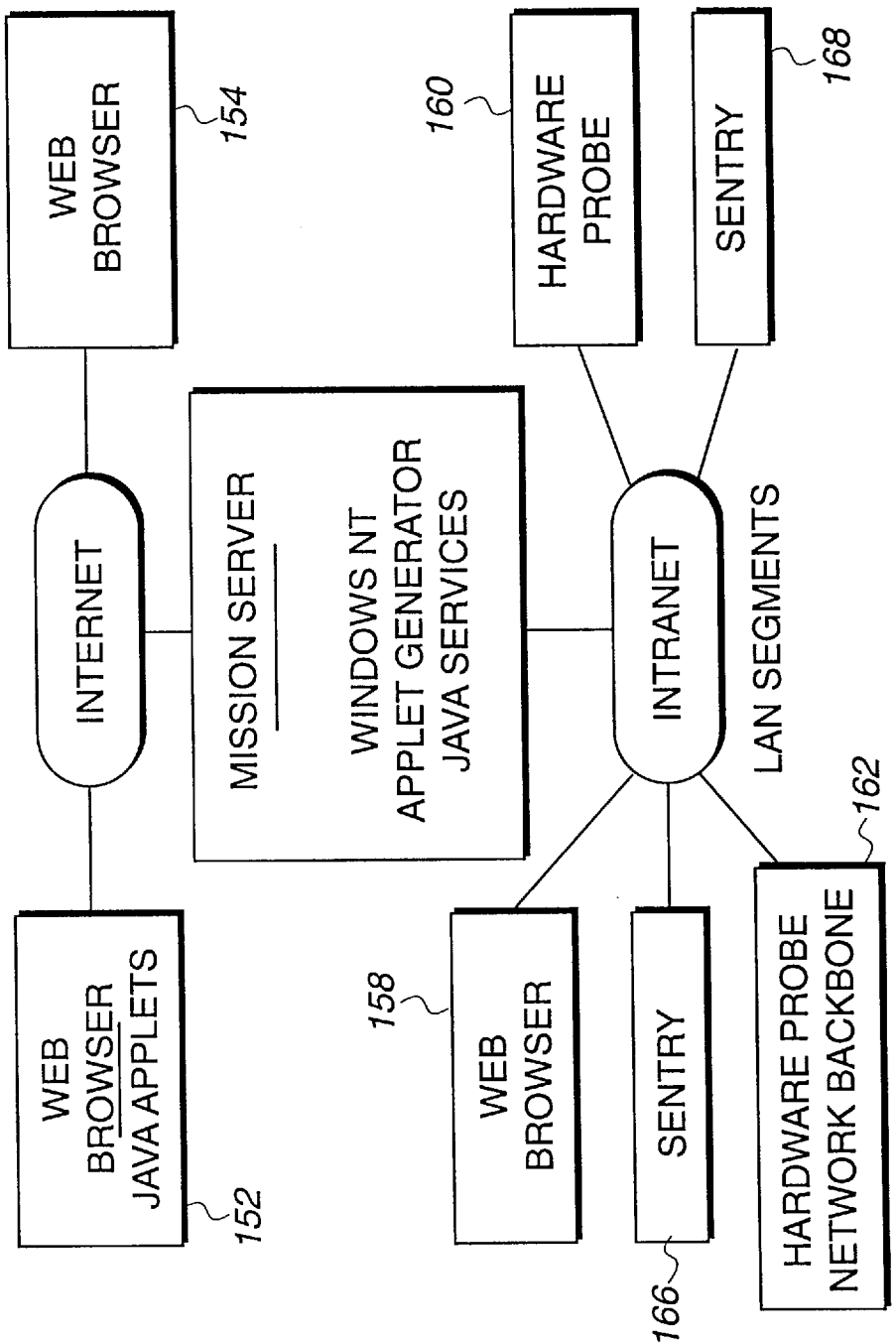
Fig. 1-B

Fig. 8
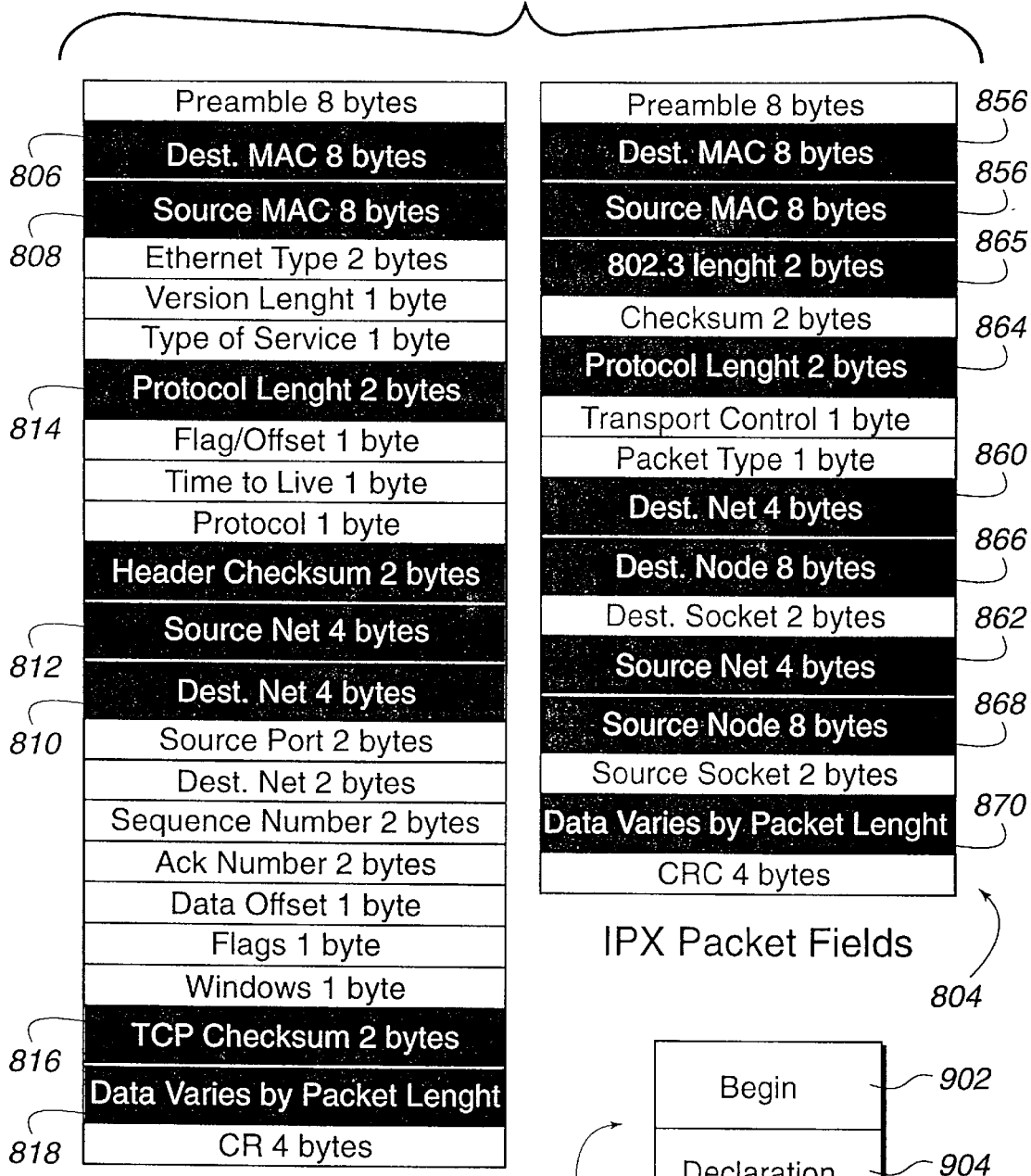
IP Packet Fields
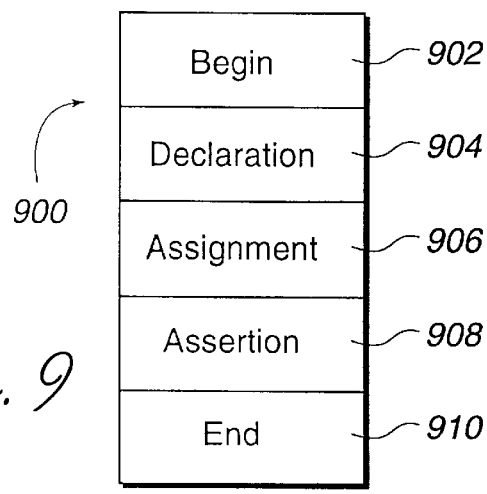
Fig. 9

METHOD AND APPARATUS FOR NETWORK ASSESSMENT

BACKGROUND OF THE INVENTION

The present invention relates generally to a method and apparatus for network assessment. The present invention may be used with a local area network ("LAN") or a wide area network ("WAN") which extends over an entire enterprise and includes a number of LAN's connected together in an "intranet." The present invention may also be used over the Internet. The present invention provides a set of software agents or sentries on devices which are physically located on segments of the network which generate and observe network traffic, together with a central controller which receives information from the sentries and assesses network performance based on that information.

In order to efficiently manage and troubleshoot a network it is of utmost importance that the network administrator be able to obtain information about the network traffic at various destinations or nodes along various segments of the network. To effectively monitor the network, the network administrator needs to know information regarding the source of the packets being routed by the network, where the packets are being routed, the capacity and level of utilization of the network, and the conditions under which the network will become unstable or overloaded. Such detailed information about the network capacity is important for management of the network so that the network configuration can be modified or additional switches, routers or other network devices can be added to the network as needed. Ideally, these changes would occur based on forecasts of network utilization before problems occur.

Information about individual packets and their routing is also necessary for troubleshooting and network optimization. For example, information about the source of a packet may show that a certain device connected to the network is inadvertently broadcasting messages or broadcasting such messages in triplicate. Information about the routing of packages may indicate that excessive traffic on one segment of the network is actually caused by traffic generated and transmitted by other segments.

Such detailed information about packets is currently obtained by using a product known as a "network sniffer" or analyzer. A network sniffer is inserted into a segment of the network where it can observe the packets which are traveling along the communication line into which it has been inserted. Network sniffers are effective to record the traffic along single lines but they are generally too costly to permanently install in the lines of a network. A common procedure is to dedicate a pool of sniffers to probing a large network and then transport the sniffers to trouble spots as such spots are detected. Part of the network must be taken down so that the sniffer can be inserted into the line for which traffic is to be measured. To minimize disruption to network users, this procedure must often occur during light traffic times such as weekends or very late at night. When installed, the sniffer collects data. In some cases data must be collected for an extended period of time before the traffic phenomena to be observed occurs.

Network analysis using a sniffer is complicated by the fact that a sniffer must be physically inserted into the network at some point. As it is not naturally a part of the network, a sniffer must collect and store its own data or transmit that data along a different communication channel than the network itself. Often it is not immediately apparent where the sniffer should be inserted to effectively diagnose a network problem. For example, the cause of excessive traffic or other network problem may be located on a different segment of the network than the segment where the problem is first observed. Thus, a costly and time consuming trial and error process must be employed in which the sniffer is physically connected to a segment, monitored, disconnected from the segment, moved to another segment, inserted there, etc. In the end, several sniffers may be required to isolate and analyze the problem. Furthermore, since the sniffer is only inserted into the network when a problem occurs, there is no early warning before problems occur or estimation of when network capacity will be exceeded or which segments are likely to fail.

What is needed is a way of using existing network hardware already installed in network segments to perform real time traffic assessment, trace individual packets, determine the source of network traffic load, estimate the network capacity, and forecast the effect of additional network traffic on network performance. Such a system would provide needed information for network management as well as information needed to locate portions of the network where a sniffer should be inserted to obtain further specific troubleshooting information.

SUMMARY OF THE INVENTION

Accordingly, the present invention provides a system and method for employing agents or sentries which generate and observe traffic on the network. The sentries are installed on existing network assets so that it is not necessary to transport additional hardware or install additional hardware in network segments. The sentries participate in the network and are capable of generating traffic on the network as well as sending data over the network. A mission control center is provided for sending mission orders to the sentries, obtaining data from the sentries, and analyzing the data collected from the sentries. The system enables the network administrator to perform real time traffic assessment, trace individual packets, optimize routing paths, determine the source of network traffic load, estimate the network capacity, and forecast the effect of additional network traffic on that capacity.

In one aspect, the present invention provides a system and method for acquiring network performance data. A mission server is connected to a network, and is operative to interface with Clients to define and receive requests for a mission. The mission as defined includes operations that require participation in the network by devices connected to a plurality of segments at a plurality of locations within the network. A plurality of sentries are provided on devices connected to the segments of the network at locations within the network so that the devices are operative to participate in the network from the segments of the network at their locations. The sentries are then operative to support the mission by participating in the network through the devices. A request for a mission is received at the mission server and the mission is communicated from the mission server to the sentries required to execute the mission. The operations of the mission are executed by the sentries and the results of the operations are communicated from the sentries to the mission server. The result of the mission is determined from the results of the operations.

These and other features and advantages of the present invention will be presented in more detail in the following specification of the invention and the figures.

BRIEF DESCRIPTION OF THE DRAWINGS

FIG. 1A is a high level diagram illustrating an embodiment of the present invention.

FIG. 1B illustrates one embodiment of the system generally depicted in FIG. 1A.

FIG. 8 illustrates how the Packet Descriptor file affects IP packet fields and IPX packet fields.

FIG. 9 illustrates the composition of a template file.

DETAILED DESCRIPTION OF THE INVENTION

Figure 2:
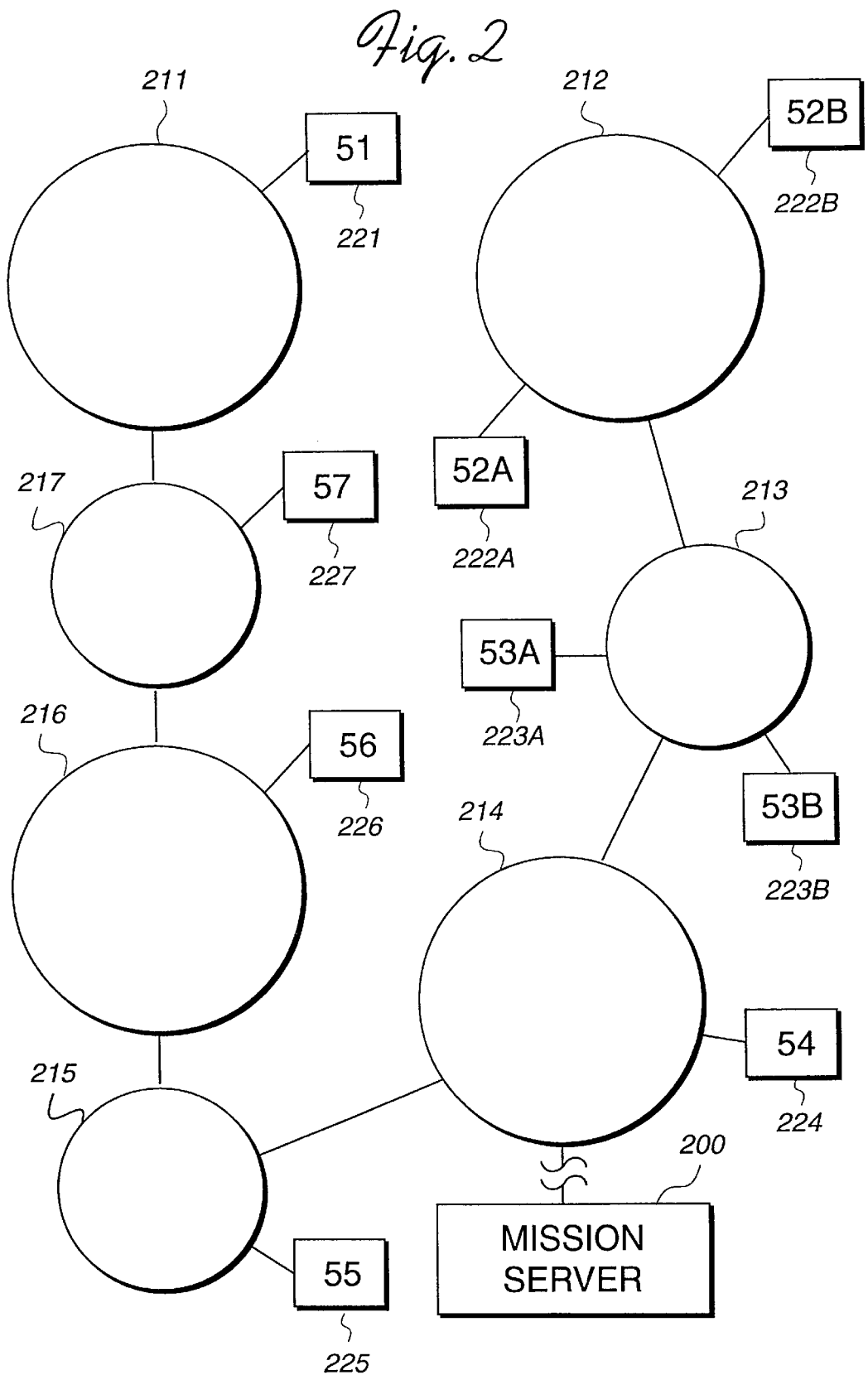
FIG. 2 illustrates how a mission server uses a set of sentries located on segments of a network to analyze network traffic or troubleshoot network malfunctions or delays.

FIG. 1A is a high level diagram illustrating an embodiment of the present invention. In this embodiment, a Client 110 desires information about a network 115. The information desired can include packet routing data, traffic volume data, packet sources, packet destinations, packet content, etc. Client 110 may be directly connected to network 115, in which case it will typically reside on a single segment of network 115. Alternatively, Client 110 may be a remote Client which is not directly connected to network 115. In order to obtain information about remote segments, Client 110 first establishes a connection with a server 120.

Client 110 communicates the network information it desires in the form of a "mission" to server 120. In one embodiment, this is accomplished as follows: server 120 provides various "mission choices" to Client 110, preferably via World Wide Web pages or Java Applets. From the mission choices, Client 110 fashions a "mission request" which it transmits to server 120 for distribution. After server 120 has distributed the mission to sentries for execution and received the results back from the sentries for the completed missions, it communicates "mission results" back to Client 110.

Server 120 is part of network 115. The connection between server 120 and other entities of network 115 may be via TCP/IP, local Ethernet, token ring, dial-up, or via any suitable network protocol which enables server 120 to participate in network 115 so that it may send and receive messages to and from devices located on a network segment 131, a network segment 132, and a network segment 133.

A sentry 141, a sentry 142, and a sentry 143 are connected to network segment 131, network segment 132, and network segment 133, respectively. Each sentry is a software agent which resides on a device connected to a network segment. The device may be a bridge, router, host PC, etc. In a preferred embodiment, each device which supports a sentry runs Microsoft Windows NT® available from Microsoft Corporation of Redmond, Wash. Preferably, server 120 also supports Windows NT.

Each sentry is designed to run in the background on the device on which it is implemented, so that the device continues to perform whatever function it is intended to perform in a manner which is unaffected by the presence of the sentry. Because the sentries are implemented on devices which already function as part of the network segments, no additional hardware is required. The sentries perform numerous network assessment tasks such as sending messages, receiving messages, tracing message routes, and sampling messages on the network segments. Although server 120 is not physically connected to every segment of network 115, server 120 cooperates with sentry 141, sentry 142, and sentry 143 to obtain information about the network traffic on the segments to which the sentries are connected. In this way, server 120 is a more powerful and versatile tool than a network sniffer, because it need not be physically connected to the segments of the network which are being analyzed. Furthermore, because the sentries are implemented on devices already participating in the network segments, and server 120 communicates with those devices over the network, the system does not require additional hardware or communication lines to gather network data.

Server 120 includes a processor and memory which keeps track of which sentries are available to it and what possible missions may be carried out by those sentries. Server 120 presents Client 110 with mission choices, depending on which sentries are available to it. Client 110 selects a mission or defines a mission including a combination of operations which may be performed by sentries available to server 120. In one embodiment, the level of detail which must be specified by the Client is reduced by making the mission choices high level selections which the server translates into the individual operations which make up the selected mission. The available sentry operations preferably include: send, receive, trace route, and sample. Each operation is performed at a sentry connected to a segment of network 115. Client 110 may also specify a periodic monitoring mission to be executed by server 120 that causes server 120 to periodically generate operations that require a sentry or set of sentries to sample the network traffic server 120 then periodically requests sentries to execute the operations server 120 may collect data and generate reports for Client 110 periodically or as requested by Client 110.

Complex network analysis missions are performed by performing operations at different sentries and gathering the resulting data. In one embodiment, not only is the mission definition provided to server 120 by Client 110 as a concise high level statement, but the instructions sent by server 120 to each sentry are also high level. Each sentry stores information regarding the operations it is required to perform for each mission. Once the mission is identified by a mission statement, the sentry performs the operations on schedule. Certain missions require operations to be performed periodically or continuously over long periods of time. A single mission request from server 120 could indicate thousands of operations to be performed by a large number of sentries over days, weeks, or months. The advantage of such high level mission definitions is that network traffic between server 120 and the sentries is minimized because only relatively short mission statements are transmitted.

Once operations supporting a mission are carried out by a sentry, network data is obtained. The sentry sends the data over network 115 to server 120. In one embodiment, each sentry tabulates data, stores the tabulated data, and transmits it to server 120 in summary form. Again, this minimizes the network traffic caused by server 120. Server 120 itself also includes a processor and memory so that server 120 can tabulate the data it receives from the sentries and provide mission results to Client 110.

In the system described, Client 110 need not be physically connected to any device on network segments which it wishes to analyze. Because server 120 communicates with network 115 and sentries are running on devices already connected to the segments of network 115, Client 110 need merely instruct server 120 to perform a mission. Server 120 can then carry out the mission by instructing appropriate sentries to perform the operations supported by the sentries (e.g., send, receive, trace route, and sample).

FIG. 1B illustrates one embodiment of the system generally depicted in FIG. 1A. A computer 150 hosts mission server 120 and includes a World Wide Web server. In its capacity as a World Wide Web server, computer 150 connects with a Client 152 and a Client 154 via the Internet. Specifically, a TCP/IP connection is established with each of the Clients to facilitate mission definition. In the embodiment depicted, both Client 152 and Client 154 function as World Wide Web browsers. In addition, Client 154 is capable of running Java Applets. Thus, computer 150 also serves as an Applet server and provides Java services.

In operation, Client 152 or Client 154 establishes a connection with the mission server residing on computer 150 in order to direct the server to perform a desired mission. Because the mission server provides Web pages and/or Java Applets, the Clients need contain no specialized software aside from the software necessary to act as a World Wide Web browser and/or run Applets.

Normally, a Client identifies itself and requests analysis of a network segment. The mission server then determines if the request is legitimate. If the requesting Client is a valid Client, the server then establishes a connection to that Client. Once a direct TCP/IP connection is established between the Client and the mission server, the server provides either Web pages or Java Applets to the Client.

To direct the mission, computer 150 is connected to an Intranet 156 including multiple LAN segments. Devices on Intranet 156 include a Client World Wide Web browser 158, a hardware probe 160, a hardware probe 162, a sentry 166, and a sentry 168. Sentry 166 and sentry 168 are implemented on different devices (preferably on different LAN segments). Each of the devices is an existing asset connected to the network 115 capable of performing various sentry operations. The results of the network analysis mission are formatted by the mission server and presented to the appropriate Client(s).

As noted, the mission request may be received from and the mission results may be presented to the Clients via Java Applets provided by the mission server and running on the Clients. In the early 1990s, a team at Sun Microsystems developed a new language, "Java," to address the issues of software distribution on the Internet. Java is a simple, object-oriented language which supports multi-thread processing and garbage collection. Although the language is based on C++, a superset of C, it is much simpler. More importantly, Java programs are "compiled" into a binary format that can be executed on many different platforms without recompilation. The language includes built-in mechanisms for verifying and executing Java "binaries" in a controlled environment, protecting the user's computer from potential viruses and security violations.

A typical Java system includes the following set of interrelated technologies: a language specification; a compiler for the Java language that produces bytecodes from an abstract, stack-oriented machine; a virtual machine (VMS) program that interprets the bytecodes at runtime; a set of class libraries; a runtime environment that includes bytecode verification, multi-threading, and garbage collection; supporting development tools, such as a bytecode disassembler; and a browser (e.g., Sun's "Hot Java" browser).

Java is designed for creating applications that will be deployed into heterogeneous networked environments. Such environments are characterized by a variety of hardware architectures. Further, applications in such environments execute atop a variety of different operating systems and interoperate with a multitude of different programming language interfaces. To accommodate such diversity, the Java compiler generates platform-neutral "bytecodes"—an architecturally neutral, intermediate format designed for deploying application code efficiently to multiple platforms.

Java bytecodes are designed to be easy to interpret on any machine. Bytecodes are essentially high-level, machine-independent instructions for a hypothetical or "virtual" machine that is implemented by the Java interpreter and runtime system. The virtual machine, which is actually a specification of an abstract machine for which a Java language compiler generates bytecode, must be available for the various hardware/software platforms which an application is to run. The Java interpreter executes Java bytecode directly on any machine for which the interpreter and runtime system of Java have been ported. In this manner, the same Java language bytecode runs on any platform supported by Java.

Compiling Java into platform-neutral bytecodes is advantageous. Once the Java language interpreter and runtime support are available on a given hardware and operating system platform, any Java language application can be executed. The bytecodes are portable since they do not require a particular processor, architecture, or other proprietary hardware support. Further, the bytecodes are byte-order independent, so that programs can be executed on both big-endian machines (e.g., Intel architecture) and little-endian machines (e.g., Motorola architecture). Since Java bytecodes are typed, each specifies the exact type of its operands, thereby allowing verification that the bytecodes obey language constraints. All told, the interpreted bytecode approach of compiled Java language programs provides portability of programs to any system on which the Java interpreter and runtime system have been implemented.

Further description of the Java Language environment can be found in Gosling, J. et al., *The Java Language Environment: A White Paper*, Sun Microsystems Computer Company, October 1995, the disclosure of which is hereby incorporated by reference for all purposes.

A distinct advantage of a network assessment system utilizing Java is that a Client need not store any information about the mission server in order to request a mission. The server provides mission choices through Java applets which provide the software necessary to define and select a mission. A Client need only store or be capable of looking up the URL for the mission server. A description of how connections are made via the World Wide Web is contained in The Whole Internet User's Guide and Catalog, by Ed Krol copyright 1992 published by O'Reilly and Associates, which is herein incorporated by reference. Once a connection with the server is made, the server supplies the mission definition software to the connected Client.

FIG. 2 illustrates how a mission server uses a set of sentries located on segments of a network 210 to analyze network traffic or troubleshoot network malfunctions or delays. As shown, network 210 includes seven segments: a segment 211, a segment 212, a segment 213, a segment 214, a segment 215, a segment 216, and a segment 217. Each segment has at least one sentry and may have one or more additional devices residing on it. Sentry 221 is connected to segment 211; sentry 222A and sentry 222B are connected to segment 212; sentry 223A and sentry 223B are connected to segment 213; sentry 224 is connected to segment 214; sentry 225 is connected to segment 215; sentry 226 is connected to segment 216; and sentry 227 is connected to segment 217.

One mission the sentries may perform is sampling network traffic on all segments. A mission server 200 is shown connected to segment 214. To execute this mission, it sends a mission statement to a portion of the sentries on network 210. The statement instructs at least one sentry per segment to sample packets at a certain frequency. Each sentry so instructed reports results to mission server 200 so that network traffic information is obtained without physically connecting to any of the segments. As mentioned above, the sentries run on preexisting network entities that perform network functions (such as router, bridge, host, etc.) which are independent from the sentry function.

Mission server 200 may also use the sentries to isolate the source of problems. For example, a malfunction in segment 213 may delay messages transmitted from segment 211 to segment 215 or cause those messages to be lost. To determine the source of the problem, server 200 defines a mission that instructs each sentry to send a message to every other sentry. Each receiving sentry is notified when each message will be sent to it and is instructed to note the delivery time, and whether errors occurred. Additionally, each transmitting sentry is instructed to trace the route of the messages it sends. This is accomplished by setting the Record Route flag in the IP header of the outgoing packet so that each node to which the packet bounces is reported back to the transmitting sentry.

As mission server 200 collects data from the sentries, the location of the problem will quickly become evident. Errors do not occur, for example, in messages sent from sentry 221 to sentry 225 which are not routed through segment 213. On the other hand, errors occur in other messages routed through segment 213, and in messages between sentry 223A and sentry 223B which never leave segment 213. This information localizes the problem in segment 213. Server 200 can then instruct sentry 223A and sentry 223B to sample packets regularly, and from this it may be discovered, for example, that a device on segment 213 is inadvertently broadcasting and causing the traffic on segment 213 to exceed capacity. In some cases, it may also be useful to physically connect a network sniffer to a malfunctioning segment. In this manner, mission server 200 saves considerable time by determining the proper segment to be analyzed.

A sentry can be instructed to sample/examine the contents of packets that it receives to gather a variety of information. For example, a sentry may be instructed to examine every 10th packet that it receives and determine where the packet originated (the source IP address), where the packet is going, the size of the packet, and what the contents of the first 12 bytes of data past the packet header are. The sentry may do this until it has examined 2000 packets and then send the summary results of this information back to the server for storing and further processing. The sentry can be instructed to conduct this type of sampling for a number of packets as in the above example or for a relatively short period of time (e.g. less than one hour) regardless of the number of packets that it receives or both, whichever occurs first. These sampling/monitoring activities are of comparatively short duration and do not require the iterative interaction of the server that long running sampling demands. If longer running sampling is required, then the server breaks up the sampling into shorter term missions which it iteratively sends to the sentries.

In addition to detecting errors which occur in messages sent along certain network segments, delays in message transmission are also assessed. Three major factors are involved in network delay as perceived by a user:

1. The workstation being used.
2. The server on which the requested files or applications resides.
3. The network infrastructure between the server and the workstation. This includes the physical media, the network topology, and any devices through which communications pass.

Quantifying the third factor is accomplished in one embodiment by replicating the Client/server "conversation" in content, sending each message included in the conversation through the network infrastructure, and measuring the time that each message takes to reach its destination. Each packet included in the conversations should traverse the network before the next packet is sent. A time stamp is placed on the packet upon transmission and another is attached to the packet upon receipt.

The clocks at the sending and receiving machines may be offset with respect to each other so that a time stamp from the sending machine is not accurate to determine the transit time of the message to the sending machine because of the time offset. However, by playing the conversation in both directions (Client and server sides), differences in local clocks on the sending and receiving machines can be made to cancel each other. Thus, the amount of time each packet takes to traverse the network is derived. A minimum conversation time is calculated by multiplying this time by the number of packets in the conversation.

The impact of a firewall or router filters is determined by first playing the conversation without filtering, and then playing the conversation with filtering. The difference in transit times is noted and the delay caused by the firewall or router filters is determined.

Transit times are calculated in one embodiment according to the method described below. Each packet is time stamped twice with a 64 bit integer. The frequency of the time stamps is smaller than 1 microsecond. The first time stamp occurs in the NDIS driver immediately before the packet is sent. This time stamp is contained in the data area of the packet. The second time stamp is applied upon notification that the packet has arrived. It is contained in the Buffer Descriptor Element that tracks the packet's size and location in the memory buffer.

A time stamp has the following makeup:
  TS: Time Stamp
  GMT: Greenwich Mean Time
  $Offset_x$: Difference between machine X local time and GMT
  $TS_x = GMT + Offset_x$ Thus the time stamp is offset from Greenwich Mean Time by $Offset_x$. Sending the packet in one directions yields the following result, where Q is the measured time for transit in one direction, Q' is the measured time for transit in the other direction, R is the real transit time for a packet traveling one direction between two machines and R' is the real transit time for a packet traveling the other direction:

$$Q = TS_x - TS_y$$

$$Q = (GMT_x + Offset_x) + R - (GMT_Y + Offset_y)$$

$$Q' = TS_y - TS_x$$

$$Q' = (GMT_Y + Offset_y) + R' - (GMT_x + Offset_x)$$

Adding Q+Q' causes the Offsets to cancel and enables an average transit time for both directions, $(Q+Q')/2 = (R+R')/2$ to be calculated. The tests in each direction should be run sequentially to minimize clock drift, since separate clocks with extremely small resolution tend to drift closer or farther apart. A verified method of transit time determination is also used in certain embodiments so that the route each packet takes is recorded in the Options field of the IP header. The RecordRoute option flag is used so that each node on the way to the destination places its IP address in the Options Data area up to and including 9 nodes. This allows verification that Route Q and Route Q' are identical.

Mission server 200 is also operative to determine the capacity and utilization of the network. By defining missions which require different sentries to generate volumes of network traffic and then monitoring the resulting performance, server 200 can simulate a network usage increase and observe the network performance which results. In this manner, mission server 200 provides data which forecasts problems that will occur when network usage increases. Mission server 200 can also identify bottle necks and determine where additional resources should be deployed to handle increased traffic.

Figure 3:
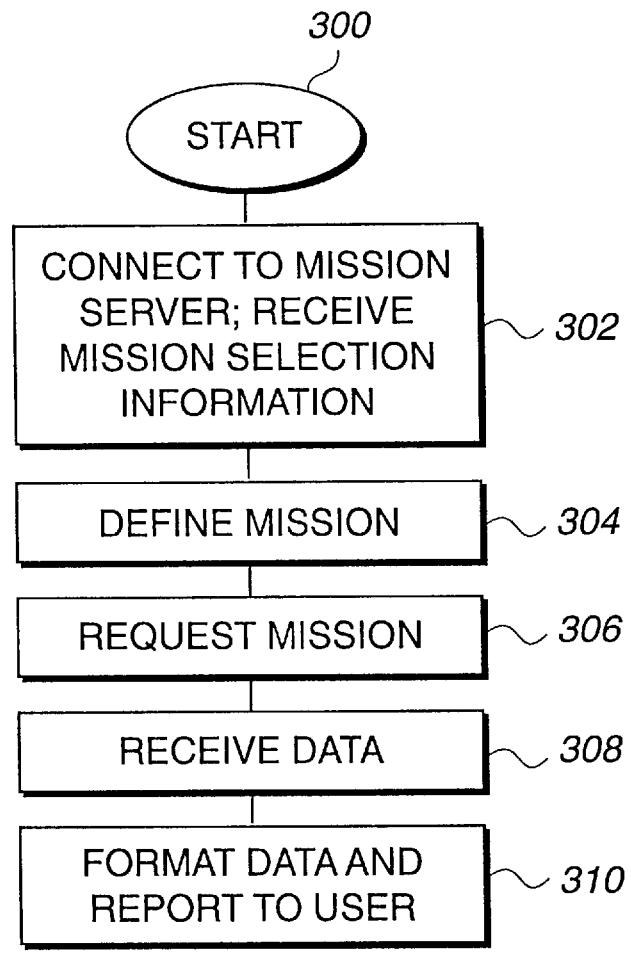
FIG. 3 is a flow diagram which illustrates the process implemented on a Client.

FIG. 3 is a flow diagram which illustrates the process implemented on a Client 110, such as Client 152, or Client 154 in FIG. 1. The process begins at step 300. In step 302, the Client 110 connects to the mission server and downloads information needed to select a mission. The mission is defined in step 304 in cooperation with the mission server. In one embodiment, this is accomplished simply by making selections from web pages provided by the mission server. In another embodiment, the Client 110 downloads Java applets and uses those applets to assist the user to define the mission. The mission is requested in step 306.

In step 308, the Client 110 receives data from the mission server. In one embodiment, a direct TCP/IP connection is set up with the mission server for data transmission. On the other embodiments, the TCP/IP connection is established prior to mission definition. In step 310, the Client 110 formats the data and reports it to the user. In embodiments which include the Client 110 receiving Java applets, the applets may be used to format and report the data.

Figure 4:
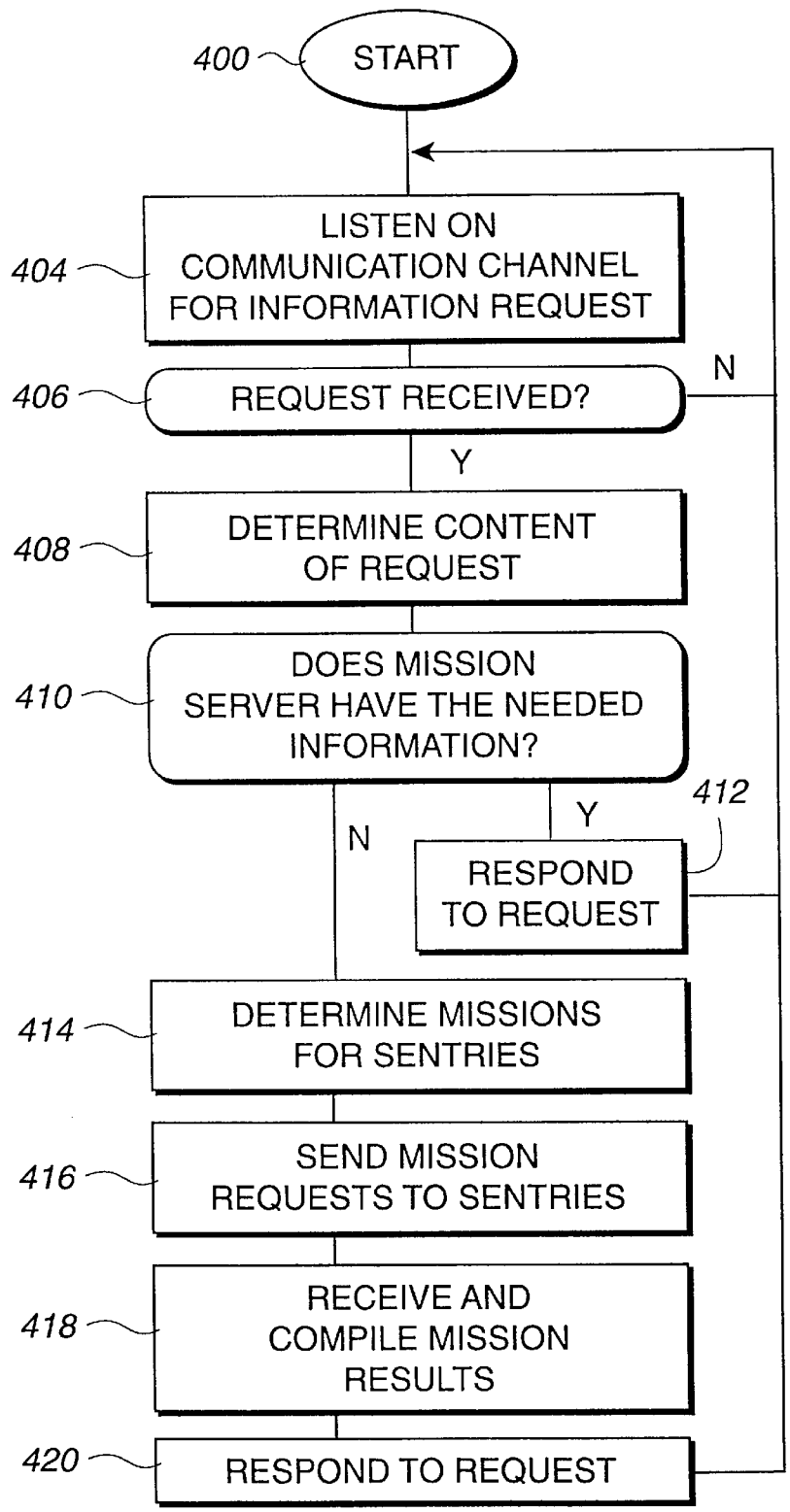
FIG. 4 is a flow diagram of a process implemented on the mission server.

FIG. 4 is a flow diagram of a process implemented on the mission server. The process begins at 400, and in a step 404, the mission server listens on a communication channel for a request from a Client. When a request is received, a step 406 transfers control to a step 408, where the mission server determines the content of the request. If the server has the needed information to fulfill the request, then a step 410 transfers control to a step 412, the mission server responds to the request, and control is transferred back to step 404. This would be the case if the request were a request for mission definition information in the form of a Web page or for data already obtained from sentries by the mission server.

If the mission server does not have the information requested, then control is transferred to a step 414. The mission server determines missions for the sentries and then sends the mission requests to the sentries in a step 416. Data relating to the mission results is received and compiled in a step 418. In a step 420, the mission server responds to the request from a Client, and control is transferred back to step 404.

Figure 5:
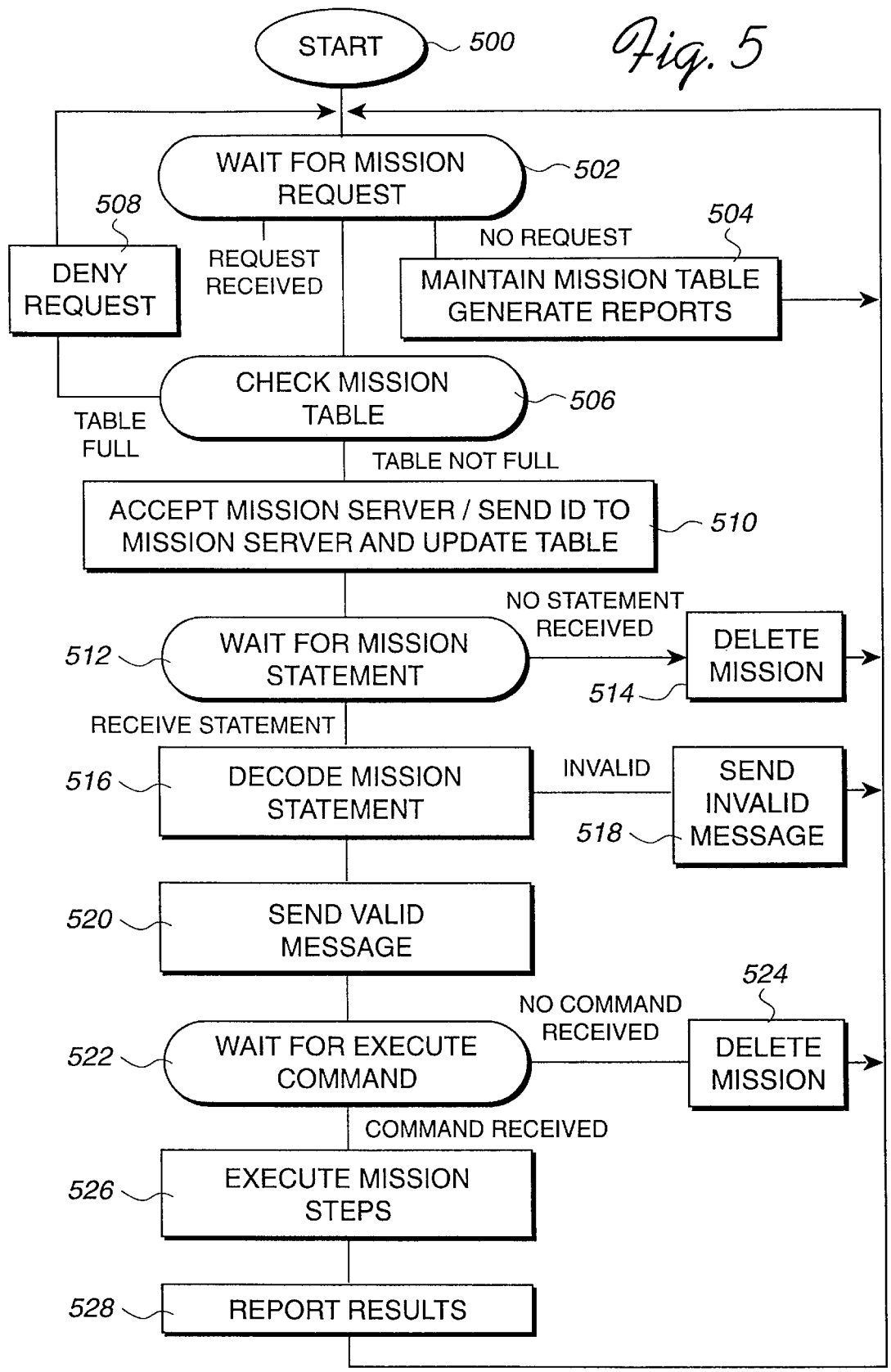
FIG. 5 is a flow diagram of the process implemented on each sentry.

FIG. 5 is a flow diagram of the process implemented on each sentry. The process starts at 500 at which point the sentry awaits a mission request in a step 502. As long as no request is received, the sentry maintains a mission table which includes all current missions which the sentry is executing and continues to generate reports in a step 504.

When a mission request is received, the sentry checks the mission table in a step 506 to determine if the table is full.

In one embodiment, each sentry is only configured to run 9 missions at once in order to limit the impact of the sentry on the operation of the device on which it is installed. If the mission table is full, then the sentry is already executing its maximum number of missions. The mission request is then denied in a step 508 and control is transferred back to step 502.

If the mission table is not full, then the sentry accepts the mission, sends an ID to the mission server, and updates the mission table in a step 510. The sentry then waits for a mission statement in a step 512. If no statement is received after a certain time, then the sentry controller deletes the mission in a step 514 and control is transferred back to step 502.

When a mission statement is received, the sentry controller decodes the mission statement and parses it to ensure that it is valid in a step 516. If the statement is invalid, the sentry sends an "invalid" message in a step 518 and control is transferred to step 502. If the mission statement is valid, then the sentry sends a "valid" statement in a step 520, and then waits for an execute command at a step 522. If no execute the mission in a step 524, and control is transferred to back to step 502. If an execute command is received, then the sentry executes the mission steps at a step 526, and the results are reported to the mission server at step 528. Control is then transferred to step 502.

The sentry thus runs in the background of the device on which it is implemented. The sentry waits for a mission request, maintains a table of the missions which it is currently executing, validates the requests, and notifies the mission server whether the request is accepted. The sentry executes the mission when it receives an execute command and reports the results to the mission server. The sentry operates independently of the mission server, executing operations, and sending reports.

The process of sending the mission statement to the sentries, validating the statement, and verifying that the sentry has room in its mission statement table for another mission enables the mission server to determine that each sentry required for the mission is available to execute the mission. If certain sentries deny the mission request, then the mission server can select other sentries or else terminate missions being executed by the sentries which denied the mission request to make room for the new mission. Thus, the mission is not executed until all sentries are available to execute the mission and have accepted the mission.

Figure 6:
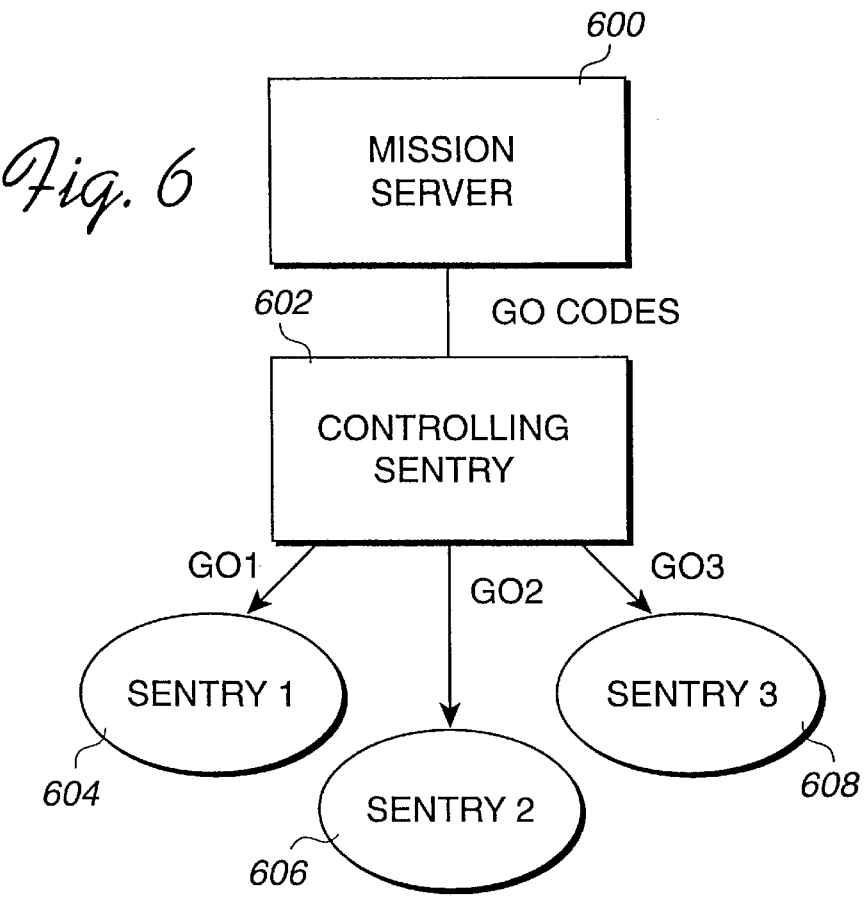
FIG. 6 illustrates the process by which a server initiates the execution of the mission.

FIG. 6 illustrates the process by which server 600 initiates the execution of the mission. The sentries have already accepted the mission request and are waiting for the command to execute the mission. Because certain operations such as send and receive require synchronization between certain entries, server 600 selects a controlling sentry 602, and authorizes it to execute the mission when ready. In one embodiment, Controlling sentry 602 sends go codes to server 600 for distribution to the other sentries that will execute the mission. Controlling sentry 602 is then able to synchronize the mission with the other sentries. In one embodiment, for a send and receive mission, the controlling sentry 602 is a receiving sentry. In the embodiment shown in FIG. 6, controlling sentry 602 sends go codes to server 600 for a sentry 604, a sentry 606, and a sentry 608. Controlling sentry 602 is thus able to synchronize the mission execution by sending go codes to the server to be distributed to the other sentries at appropriate times when it is ready to receive messages.

As noted above, missions may include sending and receiving packets by sentries. Once the server defines the mission, it communicates the mission to the sentries by sending the sentries a series of files including Packet Descriptors, Environments, and Templates. These files determine what traffic will be generated by the sending sentries and define what packets are expected to be received by the receiving sentries. A Packet Descriptor file defines what packet groups are to be used during a traffic generation test. The components of a Packet Descriptor file determine the construction of the protocol packets which are sent out during a traffic generation mission. Environment files define how the sentry sends packets during a mission. Environment files determine packet quantity, duration, continuity, looping, input and output board, and packets per second used during testing. Several individual environment files may be created, and then a particular environment file may be selected by the Client for each mission. Template files define packet formats for use in generating various types of packets for network traffic.

Typically, new Packet Descriptors and Environment files are created for the purpose of assigning specialized variables for send or receive missions. The Packet Descriptor configurations affects the construction of the protocol traffic that is created. Predefined Packet Descriptor files are also provided to the Client so that the Client may simply select a predefined Packet Descriptor file for the purpose of generating traffic.

Figure 7:
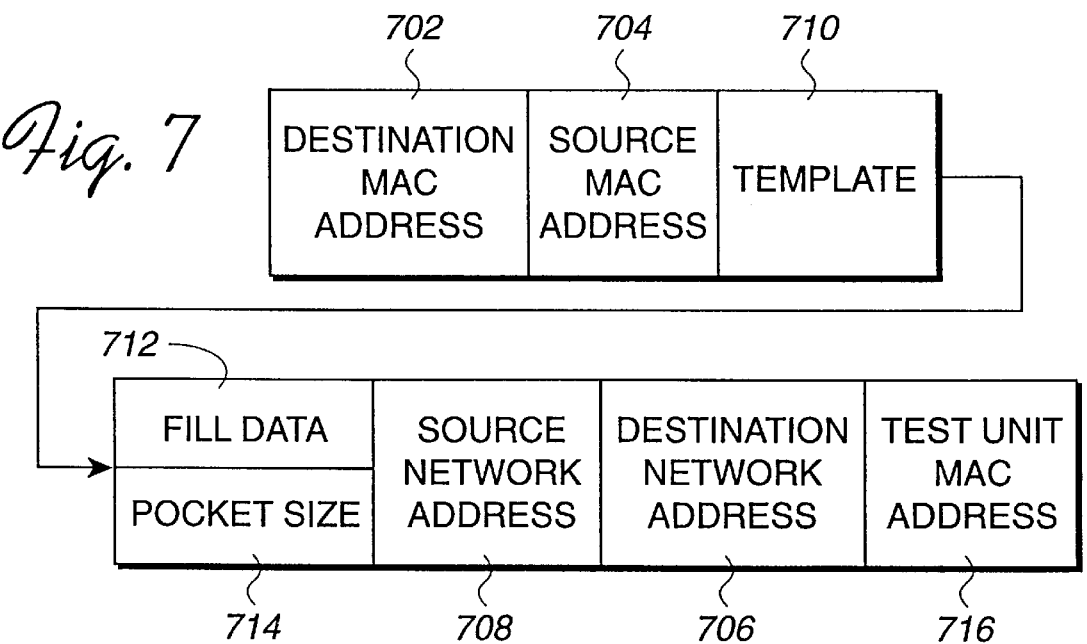
FIG. 7 illustrates a Packet Descriptor file.

FIG. 7 illustrates a Packet Descriptor file 700. Packet Descriptor file 700 includes a destination MAC address 702, and a source MAC address 704. A corresponding destination IP address 706 and a corresponding source IP address 708 are also included. Packet Descriptor file 700 also specifies a Template 710 as well as fill data 712 and a packet size 714. The test unit MAC address is specified in 716. Thus, both the MAC addresses and the IP addresses are specified for both the source and destination of the packet. Template 710 provides a standard packet format that may already contain fill data. If different or additional fill data is required, then fill data 712 is also provided and packet size 714 is specified. Packet Descriptor file 700 thus provides all the information necessary for traffic generation. The use of Template 710 enables a substantial portion of packet information to be generated from a stored format that need not be re-transmitted to each sentry for each mission. Predefined Packet Descriptor files are provided to the Client for selection, or the Client may compose new Packet Descriptor files.

The test unit MAC address and the source and destination addresses are specified in Packet Descriptor file 700 so that a specific device, for example a router, may be tested with traffic which appears to come from a source other than the sentry and which appears to the router to be sent to the destination address specified. Based on the addresses given in Packet Descriptor file 700, a sentry may be instructed to send a message to the router and to include a source address which is different than the actual source address of the sentry. A destination address is also specified, but the message is sent directly to the test unit address, which may be, for example, the MAC address of the router. (If the test unit address were not specified, then there would be no assurance that a message from a given sentry would in fact be sent through the test unit.) Thus, it is possible to specify a mission that sends messages to a router or other device and determine when the router becomes overwhelmed. The sentries are not only capable of sending packets to each other, but can also send packets to or through a specific test unit which may or may not have a sentry controller. Additionally, the sentries can specify arbitrary sources and destinations for those packets.

FIG. 8 illustrates how the Packet Descriptor file affects IP packet fields 802 and IPX packet fields 804. IP packet fields 802 are the internet protocol packet fields and IPX packet fields 804 are the Novell packet fields. The Packet Descriptor file specifies a destination MAC address 806, and a source MAC address 808, as well as a destination IP address 810 and a source IP address 812. These affect protocol length 814 and TCP checksum 816. Data 818 varies by packet length. Likewise, for IPX packet fields 804, the Packet Descriptor file specifies a destination MAC address 856, and a source MAC address 858, as well as a destination network and node address 860 and a source network and node address 862. These affect protocol length 864 and 802.3 length 865. A destination node 866 and source node 868 are also specified. Again, data 870 varies by packet length. Traffic is thus directed from the source whose MAC address is given to the node at the destination MAC address. Packet data is determined by the template and Packet Descriptor files.

FIG. 9 illustrates the composition of a template file 900. A begin section 902 identifies the network protocol for the packet template. A declaration section 904 defines the packet field names, offset locations within the packet, and field lengths. Declaration section 904 determines where the different types of information relating to the packet are located in the template file. Each field may be defined as occurring at a certain offset byte location in the template file or as occurring immediately before or after certain other fields. An assignment section 906 assigns field values from the Packet Descriptor, from constant values or from expressions. For example, an assignment may assign a certain fill pattern which takes a constant value parameter and fills the assigned field with that value repeated as necessary to fill the field. An assertion section 908 is optionally included. Assertion section 908 includes a list of one or more assertion definitions. An assertion definition consists of a field reference, a comparison operator, and then a field expression. The assertion definition is evaluated by the receiver and if the comparison returns a false result, a packet assertion error is logged. An end section 910 specifies the end of template file 900.

Upon receipt of the mission statement and acceptance of the mission, the sentry controllers at each sentry included in the mission use the information in the Template files, the Packet Descriptor files, and the Environment files to generate traffic in the case of the sending sentries, or to determine what packets from other sentries are expected by the receiving sentries. The receiving sentries then can check the message to determine errors and can also determine transmission times using the time stamping procedure described above. Sentries also sample network traffic generated by other devices. The sentries store the data thus obtained as directed by the mission statement and then report data back to the sentry server as directed by the mission statement. The sentry server receives data from the various sentries and generates reports of the mission results for the Client according to the mission statement. Thus, the mission is completed and the Client is able to generate traffic on the network which contains the sentries, monitor network traffic, and generate reports of performance data.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. It is therefore intended that the following appended claims be interpreted as including all such alterations, permutations, and equivalents as fall within the spirit and scope of the present invention.

What is claimed is:

1. A mission server for network analysis comprising:

first interface means for connecting said mission server to a remote Client, means for defining a mission based on information received from said Client;

second interface means for connecting said server to a network which is to be analyzed so that said server can send commands to and receive data relating to the execution of said commands from a sentry which is connected to a segment of said network at a location on said network;

command means for directing said sentry which is connected to said segment of said network to perform operations requiring participation in said network at a location on said segment of said network to support said mission; and processing means for determining the outcome of said mission based on the outcome of said operations at said location on said segment of said network.

2. The mission server of claim 1 wherein said command means further includes means for directing a first sentry which is connected to a first segment of said network to send a message to a second sentry which is connected to a second segment of said network.

3. The mission server of claim 2 wherein said first segment is the same as said second segment.

4. The mission server of claim 1 wherein said command means further includes means for notifying a first sentry which is connected to a first segment of said network that it should receive a message from a second sentry which is connected to a second segment of said network.

5. The mission server of claim 4 wherein said first segment is the same as said second segment.

6. The mission server of claim 1 wherein said command means further includes means for directing a sentry device which is connected to a first segment of said network to send a message to a second device which is connected to a second segment of said network and to trace the route of said message.

7. The mission server of claim 6 wherein said first segment is the same as said second segment.

8. The mission server of claim 1 wherein said command means further includes means for directing a sentry that is connected to a segment of said network to intercept packets which are traversing said segment of said network.

9. A method of acquiring network performance data comprising:

providing a mission server which is connected to a network, said mission server being operative to interface with Clients which define a mission request and transmit the mission request to said mission server;

defining a mission which includes operations that require participation in said network from a plurality of segments for mission commands execution at a plurality of locations within said network;

providing a plurality of sentries on devices connected to said segments of said network at said plurality of locations within said network so that said devices are operative to participate in said network from said segments of said network at said plurality of locations, said sentries being operative to support mission by participating in said network through said devices;

receiving a request for said mission at said mission server, communicating said mission from said mission server to said plurality of sentries on devices connected to said segments of said network at said plurality of locations within said network;

executing the operations of said mission with said plurality of sentries on devices connected to said segments of said network at said plurality of locations within said network;

communicating the results of said operations from said plurality of sentries to said mission server; and determining the results of said mission at said mission server.

10. The method of claim 9 wherein executing the operations of said mission with said plurality of sentries includes sending a packet from a first sentry to a second sentry.

11. The method of claim 9 wherein executing the operations of said mission with said plurality of sentries includes tracing the route of a message sent from one of said plurality of sentries to a one of said segments of said network.

12. The method of claim 9 wherein executing the operations of said mission with said plurality of sentries includes intercepting packets which are traversing one of said segments of said network.

13. The method of claim 9 further including transmitting data gathered by said sentries to said mission server over said network.

14. The method of claim 9 wherein said Clients are remote Clients.

15. The method of claim 9 wherein defining a mission which includes operations that require participation in said network from a plurality of segments at a plurality of locations within said network further includes selecting a mission from a set of predefined missions.

16. The method of claim 9 further including communicating the results of said mission between from said mission server to said client.

17. The method of claim 9 wherein communicating the results of said operations from said plurality of sentries to said mission server further includes communicating the results of said operations from said plurality of sentries to said mission server using said network.

18. The method of claim 9 wherein communicating said mission from said mission server to said plurality of sentries on devices connected to said segments of said network at said plurality of locations within said network further includes communicating said mission from said mission server to said plurality of sentries on devices connected to said segments of said network at said plurality of locations within said network using said network.

* * * * *